United States Patent Office 3,291,832
Patented Dec. 13, 1966

3,291,832
**PROCESS FOR PREPARING 3,4 DICHLORO-
ANILINE**
John Richard Kosak, Wilmington, and William Ervin
Meece, Newark, Del., assignors to E. I. du Pont de
Nemours and Company, Wilmington, Del., a corporation of Delaware
No Drawing. Filed Apr. 9, 1964, Ser. No. 358,645
2 Claims. (Cl. 260—580)

This invention is directed to an improved process for catalytically reducing 3,4-dichloro-1-nitrobenzene to 3,4-dichloroaniline. More particularly, the present invention relates to an improvement for producing 3,4-dichloroaniline which involves conducting the final stage of the hydrogenation of 3,4-dichloro-1-nitrobenzene at temperatures in the range of from about 170° C. to about 180° C. to chemically reduce the 3,3',4,4'-tetrachlorohydrazobenzene impurity and thereby reduce the amount of the impurity in the resultant 3,4-dichloroaniline product.

This invention is an improvement in the process disclosed in John Richard Kosak's United States patent application, Serial No. 185,800 filed on April 9, 1962 now U.S. Patent 3,145,231. The 3,4-dichloroaniline of that invention is prepared by hydrogenating 3.4-dichloro-1-nitrobenzene at about 100° C. and about 500 p.s.i.g. hydrogen pressure in the presence of a platinum catalyst and morpholine as a dechlorination inhibitor. Reduction is not completed during the hydrogenation under these conditions and a small part of the 3,4-dichloro-1-nitrobenzene is only reduced incompletely and remains as 3,3',4,4'-tetrachlorohydrazobenzene which appears in the 3,4-dichloroaniline product in amounts of about 0.5% by weight and sometimes as high as 2% by weight. Such amounts of the hydrazo compound render the 3,4-dichloroaniline commercially unacceptable without purification. One of the objections to the presence of the hydrazo compound is that it causes some end products made from the 3,4-dichloroaniline containing the hydrazo compound to be off-grade in color and purity. Under the best controlled hydrogenation conditions the 3,4-dichloroaniline commonly produced contains detrimental amounts of 3,3',4,4'-tetrachlorohydrazobenzene. The maintenance of temperatures higher than 150° C. during the main part of the hydrogenation is impractical and detrimental because it leads to the splitting off of chlorine, the development of acidity and the contamination of 3,4-dichloroaniline with other unwanted impurities.

The known prior art does not disclose the formation of detrimental amounts of the impurity 3,3',4,4'-tetrachlorohydrazobenzene in the production of 3,4-dichloroaniline by the catalytic hydrogenation of 3,4-dichloro-1-nitrobenzene or of a way to avoid the production of this impurity.

It is, therefore, an object of this invention to provide a process for producing 3,4-dichloroaniline of improved quality. Another object is to provide a process for making a commercially acceptable 3,4-dichloroaniline directly by hydrogenation of 3,4-dichloro-1-nitrobenzene. A further object is to provide a process for preparing 3,4-dichloroaniline with an unobjectionable reduced content of 3,3',4,4'-tetrachlorohydrazobenzene. These and other objects will become apparent in the following description and claims.

Surprisingly it has been discovered that the final stage of hydrogenation can be conducted at a high temperature in the range of from about 170° C. to about 180° C., after the 3,4-dichloro-1-nitrobenzene is essentially but not completely reduced to the corresponding aniline, without splitting out chlorine or otherwise adversely affecting the product. A smooth reduction of the objectionable 3,3',4,4'-tetrachlorohydrazobenzene without adverse side effects can now be accomplished under these conditions. Thus, a distinct advance in the art of making 3,4-dichloroaniline economically in a higher state of purity is achieved.

More specifically, the present invention is directed to an improvement in the process for producing 3,4-dichloroaniline by the hydrogenation of 3,4-dichloro-1-nitrobenzene at temperatures of from 30° C. to 150° C. and hydrogen gas pressures of at least 100 p.s.i.g. in the presence of platinum as a catalyst and morpholine as a dechlorination inhibitor, wherein the improvement consists of completing the reduction, after essentially all of the 3,4-chloro-1-nitrobenzene has been hydrogenated, at temperatures in the range of from about 170° C. to about 180° C. to reduce the 3,3',4,4'-tetrachlorohydrazobenzene impurity in the 3,4-dichloroaniline product.

The main process for the production of 3,4-dichloroaniline is conducted in standard equipment as a batch or continuous operation with or without solvents. In general, the reaction vessel is charged with 3,4-dichloro-1-nitrobenzene, platinum catalyst, and morpholine. Then hydrogen gas is passed into the system under pressure as the reactants are agitated and heated. This part of the reaction is judged complete when analysis shows less than 0.2% unreduced nitro compound in the reaction mass.

The hydrogen pressure may vary from about 200 to 600 p.s.i.g. The temperature may vary from 30° C. to 120° C.; about 100° C. being preferred. The platinum catalyst consists of about 1% to 5% by weight of platinum supported on carbon and is employed in a weight ratio of nitro compound to platinum within the range 25,000:1 to 125,000:1. The amount of morpholine used will vary between 0.75% and 3% by weight of the 3,4-dichloro-1-nitrobenzene.

When the main hydrogenation is judged complete, i.e., less than 0.2% of unreduced nitro compound remains, the temperature of the reaction mass is raised to between about 170° C. to about 180° C. while the hydrogen pressure is held between about 200 to about 600 p.s.i.g., preferably between 400 and 500 p.s.i.g. The hydrogenation is continued under these conditions for from about 0.5 hour to about 2 hours, depending upon the amount of 3,3',4,4'-tetrachlorohydrazobenzene contained in the 3,4-dichloroaniline and upon the temperature of the hydrogenation. One half hour usually suffices when the amount of the hydrazo compound present is of the order of 0.5% and the hydrogenation temperature is between 170° C. and 175° C. Longer times are needed when larger amounts of hydrazo compound are present. At temperatures below about 170° C. the reduction of the hydrazo compound to 3,4-dichloroaniline becomes unduly slow. In the range of 150° C. to 160° C. excessively long times are required to reduce the hydrazo compound to an acceptable extent. At temperatures above 180° C. loss of yield and contamination result from dechlorination of the dichloroaniline.

The amount of 3,3',4,4'-tetrachlorohydrazobenzene present and the extent of its hydrogenation to 3,4-dichloroaniline is determined by quantitative analysis. The analysis is based upon the fact that the hydrazo compound is insoluble in hydrochloric acid solution and is readily isolated for gravimetric determination. The analytical procedure is as follows. About 5 grams of the 3,4-dichloroaniline which has been filtered to remove the catalyst is weighed to the nearest milligram and mixed with 1 liter of 10% aqueous hydrochloric acid solution. The solution is heated to between 50° C. and 60° C. for 30 minutes with occasional stirring and filtered through a tared crucible fitted with a fiber glass disc. After washing the residue with hot 10% hydrochloric acid solution, the crucible is dried at about 115° C. and the weight of the dry residue is taken as the 3,3',4,4'-tetrachlorohydrazobenzene content of the 3,4-dichloroaniline.

After the final stage of the hydrogenation is completed, the reduction mass in the reaction vessel is filtered to recover the catalyst. The dichloroaniline product is separated from the water of reaction and dried.

The following representative example is given to illustrate the present invention. All parts are given by weight.

*Example 1*

A stainless steel autoclave equipped with a jacket for heating, coils for circulating cooling water, and an agitator is charged with 100 parts of 3,4-dichloro-1-nitrobenzene, 1 part of morpholine, and 0.0025 part of platinum consisting of platinum hydroxide deposited on Shawinigan Acetylene Black. Shawinigan Acetylene Black is a highly oleophilic carbon such as is described in U.S. Patent 2,823,235. The quantity of platinum on the carbon black is 3% by weight. Air in the autoclave and lines is displaced with nitrogen and the nitrogen is displaced with hydrogen by successive pressurings to 350 p.s.i.g. and venting to zero. The temperature of the mixture is raised to 70° C., the agitator started, and the hydrogen pressure increased to 500 p.s.i.g. Absorption of hydrogen is rapid with evolution of heat. The temperature is held at 95±5° C. by circulating cold water through the cooling coils, and the autoclave is repressured with hydrogen to 500 p.s.i.g. after each 100 lb. drop in pressure. When no further hydrogen absorption occurs the mass is held 30 minutes longer at about 95° C. and 500 p.s.i.g. for a total hydrogenation time of 40 to 60 minutes.

Analysis shows no 3,4-dichloro-1-nitrobenzene and 0.53% 3,3',4,4'-tetrachlorohydrazobenzene in a portion of the filtered 3,4-dichloroaniline product. Owing to the hydrazo compound, the dichloroaniline is unsatisfactory without purification. Formerly the product would have been purified by distillation with attendant operating cost and yield loss.

The temperature of the reaction mass is then raised to 175° C. and held for 30 minutes with the hydrogen pressure maintained at 500 p.s.i.g. An analysis for the hydrazo compound at this point shows 0.08% of it present. The heating at 175° C. is continued for another 15 minutes. No detectable acidity has developed, indicating an absence of dechlorination during the reduction of the hydrazo compound at the elevated temperature.

The reaction mass is cooled to 85° C. and then filtered. The filtrate is allowed to separate into two layers. The lower 3,4-dichloroaniline layer is drawn off. The dichloroaniline is dried by heating at 100±10° C. at 100 mm. Hg pressure to yield essentially pure dichloroaniline having a freezing point of 70.7° C. and being virtually free from 3,3',4,4'-tetrachlorohydrazobenzene. The 3,4-dichloroaniline is acceptable as a chemical intermediate without further purification.

As many apparently widely different embodiments of this invention may be made without departing from the spirit and scope thereof, it is to be understood that this invention si not limited to the specific embodiments thereof except as defined in the appended claims.

What is claimed is:

1. In the process for producing 3,4-dichloroaniline by the hydrogenation of 3,4-dichloro-1-nitrobenzene at temperatures of from 30° C. to 150° C. and hydrogen gas pressures of at least 100 p.s.i.g. in the presence of platinum as a catalyst and morpholine as a dechlorination inhibitor, the improvement consisting of completing the reduction, after essentially all of the 3,4-dichloro-1-nitrobenzene has been hydrogenated, at a temperature in the range of from about 170° C. to about 180° C. to reduce the 3,3',4,4'-tetrachlorohydrazobenzene impurity in the 3,4-dichloroaniline product.

2. In the process for producing 3,4-dichloroaniline by the hydrogenation of 3,4-dichloro-1-nitrobenzene at temperatures of from 30° C. to 150° C. and hydrogen gas pressures of at least 100 p.s.i.g. in the presence of platinum as a catalyst and morpholine as a dechlorination inhibitor, the improvement consisting of completing the reduction, after essentially all of the 3,4-dichloro-1-nitrobenzene has been hydrogenated, at a temperature of about 175° C. and a hydrogen gas pressure of about 500 p.s.i.g. to reduce the 3,3',4,4'-tetrachlorohydrazobenzene impurity in the 3,4-dichloroaniline product.

No references cited.

CHARLES B. PARKER, *Primary Examiner.*

R. V. HINES, *Assistant Examiner.*